Feb. 22, 1949.                E. A. STRETZ                2,462,689
                      INSECTICIDE DISPENSING DEVICE
                          Filed Aug. 3, 1944
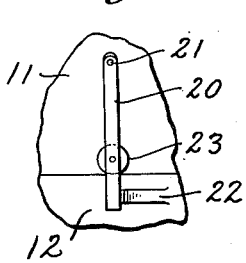
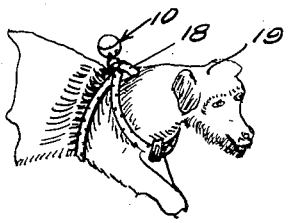
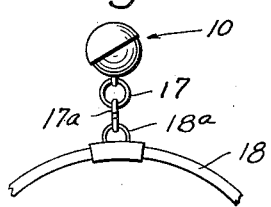
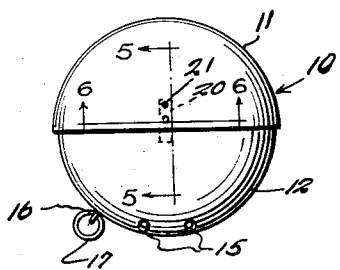
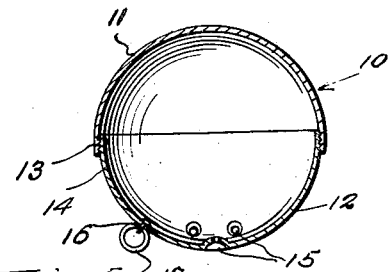
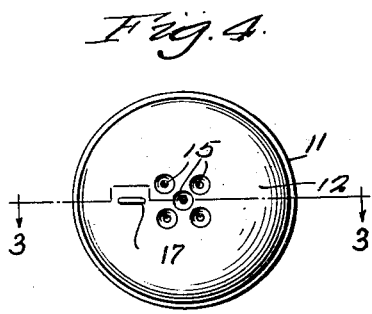
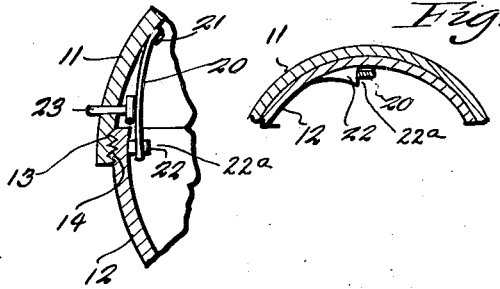
*Inventor*
ERNEST A. STRETZ,
By Clarence A. O'Brien
and Harvey B. Jacobson
                                    *Attorneys*

Patented Feb. 22, 1949

2,462,689

UNITED STATES PATENT OFFICE 2,462,689

INSECTICIDE DISPENSING DEVICE

Ernest A. Stretz, Compton, Calif.

Application August 3, 1944, Serial No. 547,931

1 Claim. (Cl. 119—159)

This invention relates to an insecticide dispensing device and more particularly to such a device adapted to be attached to the harness or collar of an animal, such as a dog or cat.

A primary object of this invention is the provision of an improved insecticide dispenser adapted to contain a powdered insecticide which may sprinkled over the animal by the motions of the animal.

An additional object is the provision of such a device which may be readily filled, being formed of two threadedly engaging hemispheres.

A still further object is the provision of means for precluding the accidental disengagement of such threaded hemispheres occasioned by the movements of the animal.

A still further object resides in the provision of a means as set forth in the foregoing object which may be readily disengaged when it is desired to refill the article.

An additional object is the provision of such a device which will be durable in construction, wear-resistant, and reliable and efficient in operation, as well as relatively simple and inexpensive to manufacture.

Other objects will in part be obvious and in part be pointed out hereinafter and shown in the accompanying drawings wherein there is shown a preferred embodiment of this inventive concept.

In the drawings,

Figure 1 is a fragmentary perspective view showing the device of the instant invention as attached to the harness worn by an animal.

Figure 2 is a side elevational view of the insecticide dispenser.

Figure 3 is a sectional view taken substantially along the line 3—3 of Figure 4 as viewed in the direction indicated by the arrows.

Figure 4 is a bottom elevational view of the device.

Figure 5 is an enlarged fragmentary sectional view taken along the line 5—5 of Figure 2 as viewed in the direction indicated by the arrows.

Figure 6 is an enlarged fragmentary sectional view taken along the line 6—6 of Figure 2 as viewed in the direction indicated by the arrows.

Figure 7 is a fragmentary elevational view of the constructional detail shown in Figure 5, as viewed from the right.

Figure 8 is an enlarged fragmentary view showing the attachment of the device to the harness of an animal, certain parts being relatively exaggerated for the sake of clarity.

Like reference numerals refer to like parts throughout the several views of the drawings.

Having reference now to the drawings, the dispensing device, generally indicated at 10, is comprised of two hemispherical portions 11 and 12. Portion 11 is slightly larger in diameter than portion 12 and is internally threaded as at 13 while portion 12 is externally threaded as at 14, the two hemispheres thus being adapted to engage to form a relatively spherical object. Portion 12 is provided with a plurality of indented perforations 15 therethrough covering a portion of its surface area and has, secured to a ring 16 positioned adjacent its lower extremity a second ring 17 by means of which it is adapted to be secured to the harness 18 of an animal, such as dog 19 (see Figure 1). The attaching means may take the form of a split or separable ring 17a engaging the ring 17 and an eye 18a on the harness 18 (see Figure 8), or may be of any other desired conventional form.

In the operation of the device the hemi-spheres are separated and filled with any desired powdered insecticide, then threaded together and the dispenser 10 secured to the harness 18 on the animal. As the animal runs about or otherwise moves, relatively small quantities of the insecticide will escape through perforations 15 to be scattered over his coat and serve to repel or destroy any insect contained therein or alighting thereon.

When the device is attached to such an animal as, for example, a puppy, it is apparent that violent motions of the animal might result in the unscrewing of the threads of the two hemispheres resulting in the spilling of a material quantity of insecticide in undesired locations. Means are accordingly provided whereby such accidental disengagement of the two hemispheres are precluded and take the form of a small resilient leaf spring 20 secured by a pin 21 to the interior wall of hemisphere 11, adapted to engage and abut a tapered detent 22 (see Figure 6), having a squared or perpendicular face 22a secured to the inner wall of hemisphere 12. A small push button 23 extending through a suitable aperture in the wall of hemisphere 11 adjacent spring 20 is so positioned as to permit the spring 20 to be readily released from detent 22 when it is desired to unscrew the two hemispheres for refilling or cleaning or the like. In securing the hemispheres together, it will be obvious that the spring 20 will ride up and over the tapered incline of detent 22, but upon reverse movement of the parts the spring will engage the squared face 22a to preclude relative turning of the parts until released by pushing the button 23.

Obviously, the device may be made of any desired material such as plastic or thin metal or the like, and may be made in a variety of sizes and shapes for various types of animals and related purposes.

From the foregoing it will now be seen that there is herein provided an insecticide dispensing device accomplishing all the objects of this invention and others including many advantages of great practical utility.

As many embodiments may be made of this inventive concept and as many modifications may be made in the embodiment herein shown and described it is to be understood that all matter herein is to be interpreted merely as illustrative and not in a limiting sense.

I claim:

An insecticide dispenser for animals comprising a pair of separable interlocking hemispherical segments, one segment being externally threaded about its outer peripheral edge, the other segment being internally threaded about its inner peripheral edge for threadable engagement over the threaded portion of said first mentioned segment, an inwardly extending detent on the inner wall of one of said segments, a leaf spring attached to the inner surface of the other segment provided with an aperture through its free end adapted to resiliently engage and overlie said detent when said sections are threaded together to form a spherical body for containing an insecticide, a release button slidably disposed through the wall of the receptacle supporting the leaf spring engageable therewith for disengaging the same from said detent for permitting the unscrewing and separation of said hemispherical segments, one of said segments having insecticide dispensing apertures formed therethrough, and pivotal means adjacent said dispensing apertures for supporting said dispenser upon the body of an animal.

ERNEST A. STRETZ.

REFERENCES CITED

The following references are of record in the file of this patent:

UNITED STATES PATENTS

| Number | Name | Date |
|---|---|---|
| 95,109 | Hendrik | Sept. 21, 1869 |
| 1,042,494 | Smith | Oct. 29, 1912 |
| 1,240,043 | Gregory et al. | Sept. 11, 1917 |
| 1,262,447 | Carr | Apr. 9, 1918 |
| 2,102,775 | Woodhead | Dec. 21, 1937 |
| 2,125,419 | Birk | Aug. 2, 1938 |
| 2,219,569 | Vanderhoof | Oct. 29, 1940 |
| 2,346,181 | Overend | Apr. 11, 1944 |

FOREIGN PATENTS

| Number | Country | Date |
|---|---|---|
| 24,324 | Great Britain | Oct. 21, 1897 |